W. T. CLARK & W. B. BRONANDER.
PIPE CUTTING MACHINE.
APPLICATION FILED JAN. 21, 1916.

1,278,857.

Patented Sept. 17, 1918.
2 SHEETS—SHEET 1.

Inventor
William T. Clark & Wilhelm B. Bronander
By their Attorney
E. W. Marshall W. T. CLARK & W. B. BRONANDER.
PIPE CUTTING MACHINE.
APPLICATION FILED JAN. 21, 1916.
1,278,857.
Patented Sept. 17, 1918.
2 SHEETS—SHEET 2.
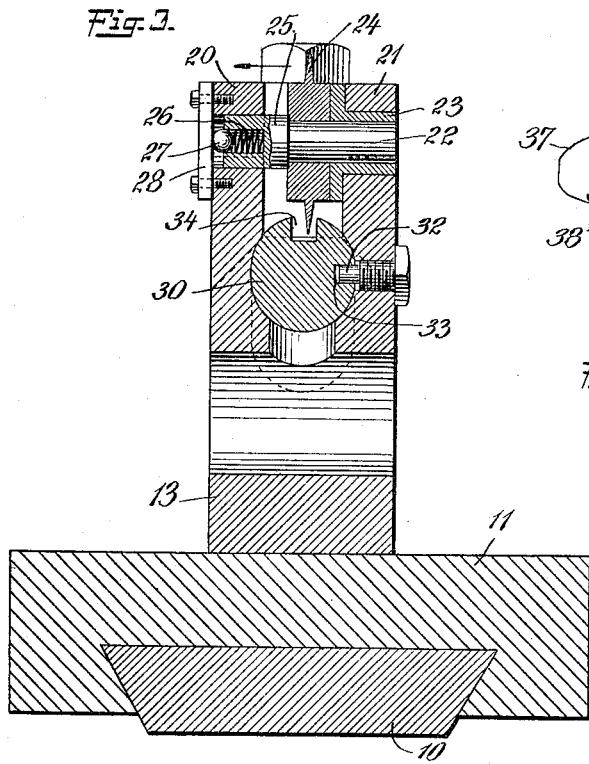
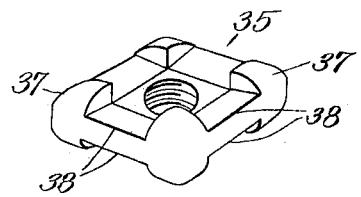
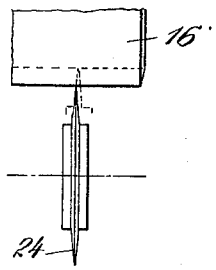
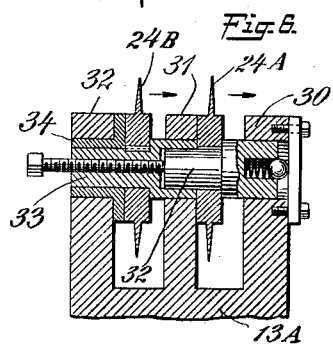
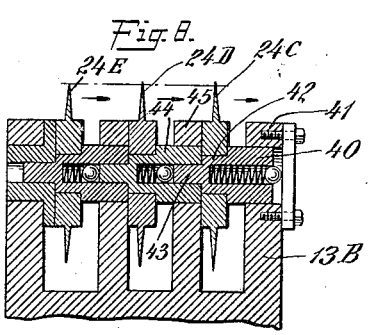
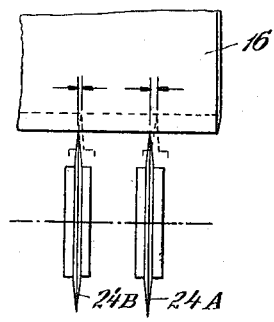
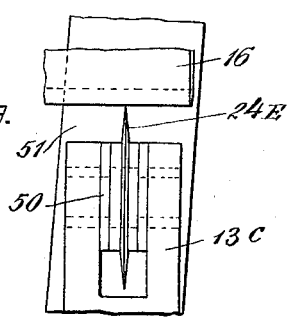
Inventors
William T. Clark & Wilhelm B. Bronander
By their Attorney
E. W. Marshall

UNITED STATES PATENT OFFICE.

WILLIAM T. CLARK, OF NEW YORK, AND WILHELM B. BRONANDER, OF BROOKLYN, NEW YORK, ASSIGNORS TO AUTOMATIC MACHINE PRODUCTS CO., OF BROOKLYN, NEW YORK, A CORPORATION OF NEW YORK.

PIPE-CUTTING MACHINE.

1,278,857.     Specification of Letters Patent.      Patented Sept. 17, 1918.

Application filed January 21, 1916. Serial No. 73,292.

*To all whom it may concern:*

Be it known that we, WILLIAM T. CLARK, a citizen of the United States, and a resident of New York, Bronx county, and State of New York, and WILHELM B. BRONANDER, a citizen of the United States, and a resident of Brooklyn, Kings county, and State of New York, have invented certain new and useful Improvements in Pipe-Cutting Machines, of which the following is a specification, reference being had to the accompanying drawings, forming a part thereof.

Our invention relates to improvements in pipe cutting machines, and its object is to provide a simple and effective machine by means of which pipe or tubing may be cut transversely with little loss of metal and with the use of a minimum amount of power. More specifically, its object is to provide a machine for cutting up pipe or tubing into rings of a predetermined width, such, for example, as the copper bands which are used on shrapnel shells.

These and other objects of the invention will appear in the following specification in which we will describe our invention, the novel features of which will be set forth in appended claims.

Referring to the drawings:

Fig. 3 is a sectional front elevation of the parts shown in Fig. 2, the section being taken on the line 3—3 of the latter figure.

Fig. 4 is a perspective view of one of the cutters which is used in the machine shown in the preceding figures.

Fig. 5 is a plan view of a part of a pipe or tube and rotary knife which forms a part of our improved machine, and illustrates the path of the knife during its operation.

Fig. 6 is a sectional front elevation of a part of one of our machines in which more than one rotary knife is used.

Fig. 7 is a plan view similar to Fig. 5, and illustrates the paths of the knives shown in Fig. 6.

Fig. 8 is a sectional front elevation of another modification of the knife mounting, showing in this case three of such knives.

Fig. 9 is a plan view partly diagrammatic illustrating another way of carrying out our invention.

Like characters of reference designate corresponding parts in all the figures.

Figure 1:
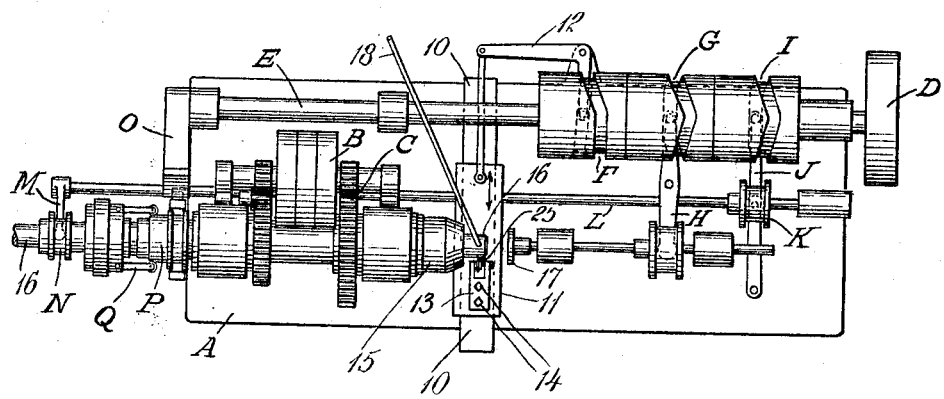
Figure 1 is a plan view of a machine which embodies our invention.

10 designates a transverse guide which is a part of the bed A of the machine to which our invention is applied. 11 is a transversely movable carriage, and 12 is an oscillating arm by means of which the carriage 11 is moved on the guide 10. A bracket 13 is affixed to this carriage by the bolts 14. 15 is a rotary chuck which holds the pipe or tube 16 in the desired position. 17 is an adjustable plunger by means of which the position of the tube in the chuck is predetermined. A pipe 18 is provided through which a supply of oil or other lubricant may be applied to the tube during the cutting operation.

The machine comprises a belt driven sheave B and gears C by means of which the chuck 15 is driven at a comparatively high rate of speed. Another belt driven sheave D rotates a shaft E slowly. On this shaft is a cam F by means of which the arm 12 is oscillated, another cam G for actuating the plunger 17 through a pivoted lever H, and a third cam I which at each revolution of the shaft E moves the tube 16 forward against the plunger 17 through a pivoted lever J, a collar K fixed to a slide rod L, an arm M on the end of rod L and a grip collar N surrounding the tube 16.

On the end of the shaft E is a segment O which has a peripheral cam which is arranged to impart an axial movement to a collar P on the outer surface of which is a cam which acts upon levers Q. These are connected with the jaws of the chuck 15 to release them from the tube 16 at the time it is to be moved forwardly, and to tighten them onto the tube after it has been moved to its new position.

Figure 2:
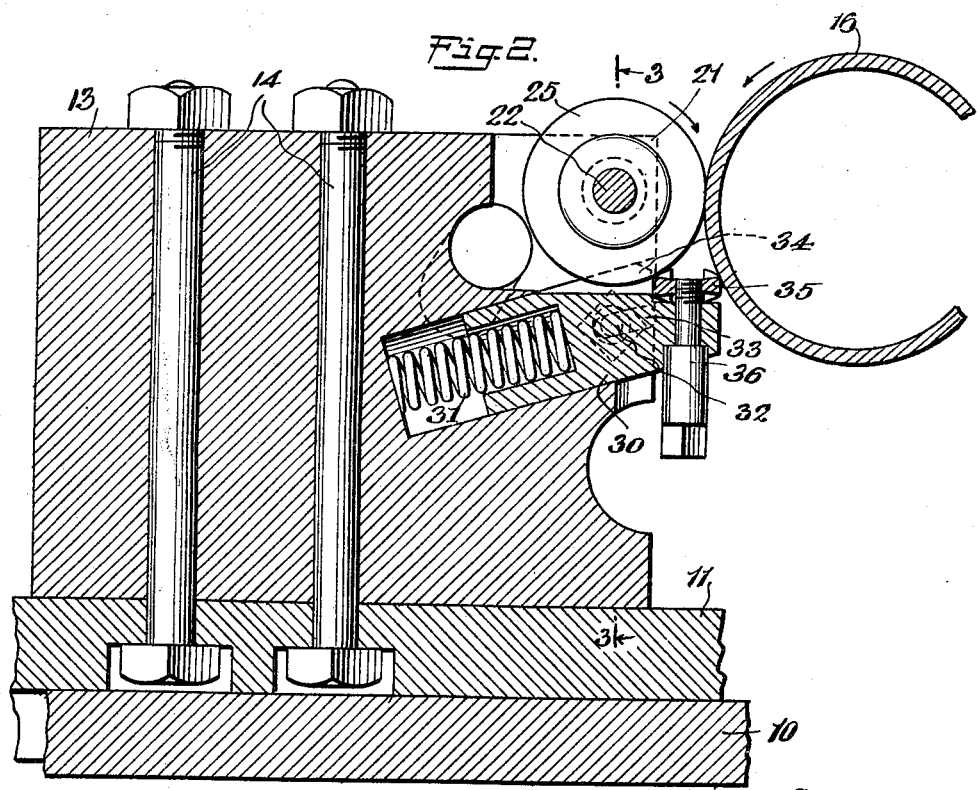
Fig. 2 is a sectional side elevation, on a larger scale, of a part of the machine which is shown in Fig. 1.

In the mechanism which is shown in Figs. 1, 2 and 3, the bracket 13 is constructed with two spaced arms 20 and 21, in which a small shaft 22 is supported in a position parallel with the axis of the tube. One end of this shaft is supported in a bushing 23 in the arm 21 and adjacent to this bushing is a rotary knife 24. The part of the shaft beyond the knife is of larger diameter and this part 25 is supported in the other arm 20. An axial hole in the large part of the shaft receives a compression spring 26 which presses against a ball 27 which is held in position by a plate 28 affixed to the side of arm 20. The shoulder formed by the two parts of shaft 22 of different diameters thus tends to force the knife 24 against the bushing 23 but the spring allows the shaft and the cutter to move toward the arm 20 under certain conditions.

Under the knife 24 a plunger 30 is mounted in bracket 13 at an incline as shown in Fig. 2. This plunger is pressed outwardly by a spring 31 but its outward movement is limited by a pin 32 which projects into a slot 33 cut in the side of the plunger. The upper forward edge of the plunger is cut away as at 34 to clear the knife 25.

This plunger supports a cutter 35 which is secured thereto by a vertical bolt 36. The cutter itself is shown in detail in Fig. 4, where it may be seen that it comprises four rounded corners 37 between each two of which are four cutting or scraping edges 38 on each side, or eight altogether, as this cutter is reversible and is also so arranged that it may be held by the bolt 36 in any one of four operative positions.

Before describing in detail the other figures of the drawings, we will describe the operation of the apparatus shown in Figs. 1, 2, 3, 4 and 5.

The machine itself is so arranged that the chuck 15 is opened and the tube 16 forced through it to the right, as viewed in Fig. 1. The plunger 17 is then moved to the left a predetermined amount to push the tube back until a desired length of it protrudes from the chuck, after which the chuck is closed upon the tube. These operations are performed while the chuck is rotating and take place automatically, after which the arm 12 moves the carriage 11 in the direction to move the bracket 13 toward the tube.

These parts and their operation are but briefly described, as they are well known and form no part of our invention.

As the knife 24 comes in contact with the tube 16 it is rotated thereby but in the opposite direction. As the knife enters the body of the tube it becomes displaced laterally as shown in Fig. 5, the spring 26 and the support of the knife which has been described providing for this lateral movement which may be substantially equal to one-half of the width of the blade of the knife. This lateral movement is necessary because that part of the tube which is held in the chuck is incapable of longitudinal movement, whereas the outer end which is cut off becomes free to move longitudinally as the cutting movement continues. In this manner the end of the tube is sheared off with the loss of practically no metal.

There is, however, a slight bur raised on the outside of the tube during the cutting operation, and this is scraped off by one of the edges 38 of the cutter 35.

In the arrangement shown in Fig. 6 the bracket 13$^A$ is constructed with three spaced arms 30, 31 and 32. The knife 24$^A$ is mounted on a spring-pressed shaft 32 as in the other case, which has a shoulder which presses the knife against the arm 31. The small end of shaft 32 fits into an opening in the large end of another alining shaft 33, the outside of which fits a bearing in arm 31. Another rotary knife 24$^B$ is rotatably mounted upon the small end of shaft 33 and is pressed against a bushing 34 in arm 32 by a shoulder formed in the shaft 33 between the large and the small parts thereof. A screw 35 passing through shaft 33 and abutting against the inner end of shaft 32 may be used to regulate the distance between the two knives.

In operation, the two knives move to the right as indicated by the arrows, but as may be seen in the diagram, Fig. 7, the knife 24$^A$ has a greater lateral movement than has the knife 24$^B$ as compensation must be provided for the metal displaced by both of these knives. It is also to be noted that the diameter of knife 24$^A$ is slightly greater than that of the other knife, as the ring which is cut off by it must be separated before the ring between the two knives is separated from the part of the tube which is held in the chuck.

In the arrangement shown in Fig. 8, any desired number of knives may be used. Three are shown, designated respectively 24$^C$, 24$^D$, and 24$^E$ of progressively decreasing diameters. These are each rotatably supported on shafts mounted in a bracket 13$^B$. The first of these shafts has a part 40 of large diameter which is in a bearing in arm 41 of bracket 13$^B$, a part 42 of intermediate diameter upon which the knife 24$^C$ is supported, and a small part 43 which enters a central hole in the large part 44 of the shaft for knife 24$^D$, the outside of which is in a bearing in arm 45 of bracket 13$^B$. Within each of the shafts is a spring which presses its respective shaft to the left and by means of the shoulders formed between the large and intermediate parts of the shaft presses its respective knife against the adjacent arm of the bracket, and these springs as in the other cases allow for the lateral displacement of the knives during the cutting operation.

In Fig. 9 the rotary knife 24$^E$ is supported on a shaft 50 which is parallel with the axis of the tube 16 and which is mounted in a bracket 13$^C$. But in this case the bracket is guided toward the tube on a guideway 51 which is oblique to the axes of the knife and the tube, and provides for the required transverse movement of the knife during the cutting operation.

We have illustrated and described several forms of mechanisms embodying our invention to show that it is not limited to any specific form or construction, and in fact we intend no limitations other than those imposed by the appended claims.

The invention is, of course, applicable to other uses than the making of shrapnel shell bands, but we have described this particular use as one to which the invention is peculiarly adapted. Such bands must be made with great accuracy and are made with beveled edges, the bevel of which is provided for by properly shaping the blades of the knives.

What we claim is:

1. A pipe cutting machine comprising means for rotating a pipe about its axis, a rotary knife having a beveled blade, a support therefor, means for moving said support toward the rotating pipe, and means for providing a lateral movement of the knife relative to the pipe during the cutting operation.

2. A pipe cutting machine comprising means for rotating a pipe about its axis, a rotary knife having a beveled blade, a support therefor arranged to hold the knife with its axis parallel with that of the pipe, means for moving said support toward the rotating pipe, and means automatically providing a lateral movement of the knife relative to the pipe during the cutting operation.

3. A pipe cutting machine comprising means for rotating a pipe about its axis, a bracket having a movement at right-angles to the axis of the pipe, a rotary knife having a beveled blade, a shaft therefor in said bracket parallel with the axis of the pipe, and resilient means for pushing said knife laterally into a predetermined position and permitting a lateral movement of the knife relative to the pipe in the opposite direction during the cutting operation.

4. A pipe cutting machine comprising means for rotating a pipe about its axis, a bracket having a movement at right angles to the axis of the pipe, a rotary knife having a beveled blade, a shaft therefor in said bracket parallel with the axis of the pipe, said shaft having a shoulder abutting against the knife, and a spring pressing the shaft longitudinally and through said shoulder, pushing the knife laterally against a portion of said bracket, said spring being arranged to permit a lateral movement of the knife in the opposite direction during the cutting operation.

5. A pipe cutting machine comprising means for rotating a pipe about its axis, a rotary knife, a support therefor, means for moving said support toward the rotating pipe, and means for providing a lateral movement of the knife during the cutting operation, combined with a cutter transverse to said knife for removing bur raised by the knife.

6. A pipe cutting machine comprising means for rotating a pipe about its axis, a rotary knife having a beveled blade, a support therefor arranged to hold the knife with its axis parallel with that of the pipe, means for moving said support toward the rotating pipe, and means automatically providing a lateral movement of the knife during the cutting operation, combined with a cutter having a cutting edge parallel with the axis of the pipe; and resilient means for pressing said cutter against the pipe.

7. A pipe cutting machine comprising means for rotating a pipe about its axis, a bracket having a movement at right angles to the axis of the pipe, a rotary knife having a beveled blade, a shaft therefor in said bracket parallel with the axis of the pipe, resilient means for pushing said knife laterally into a predetermined position and permitting a lateral movement of the knife in the opposite direction during the cutting operation, combined with a plunger mounted in said bracket, a spring pressing said plunger outwardly, and a cutter on said plunger having a cutting edge parallel with the axis of the pipe.

8. A pipe cutting machine comprising means for rotating a pipe about its axis, a bracket having a movement at right angles to the axis of the pipe, a rotary knife having a beveled blade, a shaft therefor in said bracket parallel with the axis of the pipe, resilient means for pushing said knife laterally into a predetermined position and permitting a lateral movement of the knife in the opposite direction during the cutting operation, combined with a plunger mounted in said bracket, a spring pressing said plunger outwardly, and a cutter on said plunger, said cutter having smooth corners adapted to be pressed against the pipe and an intermediate cutting edge.

9. A pipe cutting machine comprising means for rotating a pipe about its axis, a bracket having a movement at right angles to the axis of the pipe, a rotary knife having a beveled blade, a shaft therefor in said bracket parallel with the axis of the pipe, resilient means for pushing said knife laterally into a predetermined position and permitting a lateral movement of the knife in the opposite direction during the cutting operation, combined with a plunger mounted in said bracket, a spring pressing said plunger outwardly, a cutter on said plunger, said cutter having four smooth corners adapted to be pressed against the pipe and two intermediate cutting edges between each two of said corners, and means for affixing the cutter to the plunger in different positions to bring any one of its cutting edges into operative relation with the pipe.

10. A pipe cutting machine comprising means for rotating a pipe about its axis, a bracket having a movement at right angles to the axis of the pipe, a rotary knife having a beveled blade, a shaft therefor in said bracket parallel with the axis of the pipe, said shaft having a shoulder abutting against the knife, and a spring pressing the shaft longitudinally and through said shoulder, pushing the knife laterally against a portion of said bracket, said spring being arranged to permit a lateral movement of the knife in the opposite direction during the cutting operation, combined with a plunger mounted in said bracket, a spring pressing said plunger outwardly, a cutter on said plunger, said cutter having four smooth corners adapted to be pressed against the pipe and two intermediate cutting edges between each of said corners, and means for affixing the cutter to the plunger in different positions to bring any one of its cutting edges into operative relation with the pipe.

11. A pipe cutting machine comprising means for rotating a pipe about its axis, a plurality of rotary knives, a support therefor, means for moving the support toward the pipe, and means for automatically providing different amounts of lateral movement to the several knives during the cutting operation.

12. A pipe cutting machine comprising means for rotating a pipe about its axis, a bracket having a movement at right angles to the axis of the pipe, a plurality of rotary knives each having a beveled blade, a shaft therefor in said bracket parallel with the axis of the pipe, and resilient means for pushing said knives laterally into predetermined positions and permitting a different amount of lateral movement to each of the knives in the opposite direction during the cutting operation.

In witness whereof, we have hereunto set our hands this 15th day of January, 1916.

WILLIAM T. CLARK.
WILHELM B. BRONANDER.

Copies of this patent may be obtained for five cents each, by addressing the "Commissioner of Patents, Washington, D. C."